United States Patent Office 3,792,177
Patented Feb. 12, 1974

3,792,177
PHOSPHATE-HYDROGEN PEROXIDE ADDUCT AS A FOOD PRESERVATIVE
Hiromi Nakatani and Kiyoshi Katagiri, Kyoto, Japan, assignors to Takeda Chemical Industries, Ltd., Osaka, Japan
No Drawing. Filed Feb. 5, 1969, Ser. No. 796,891
Claims priority, application Japan, Feb. 7, 1968, 43/7,589
The portion of the term of the patent subsequent to Dec. 8, 1989, has been disclaimed
Int. Cl. A23f 1/06
U.S. Cl. 426—178          9 Claims

ABSTRACT OF THE DISCLOSURE

By admixing an acid metal phosphate with water-soluble metal phosphate-hydrogen peroxide adducts, the deleterious effects thereof on food products to which they are added as stabilizers due to their alkalinity are overcome.

BACKGROUND OF THE INVENTION

This invention relates to a method for improving the quality of foodstuffs. The term "foodstuffs" as used throughout this specification, including the claims, means any and all foodstuffs, whether primarily processed or secondarily processed, as well as any starting materials to be employed in the production of such foodstuffs.

Hitherto, in the production of foodstuffs, whether primarily processed or secondarily processed, such as meat, fish meat, soybean curd (tofu in Japanese), soybean paste (miso in Japanese), soysauce, bean jam, bread, cereals, starch, gluten, cakes, ice cream and other foods and drinking water, or in the treatment of raw edible materials for use in the production of such foods and drinking water, it has been the practice to improve the quality of such foods and drinking water by the addition thereto of an alkali metal pyrophosphate-hydrogen peroxide adduct which has the general formula $M_4P_2O_7 \cdot 2H_2O_2$ (wherein M represents alkali metal), a dialkali metal phosphate-hydrogen peroxide adduct which has the general formula $M_2HPO_4H_2O_2$ (wherein M represents alkali metal), or a tri-polyphosphate-hydrogen peroxide adduct which is represented by the general formula

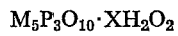

$$M_5P_3O_{10} \cdot XH_2O_2$$

(wherein M represents an alkali metal and X stands for any optical number of moles).

However, as aqueous solutions of these metal phosphate-hydrogen peroxide adducts invariably exhibit strong alkalinity (e.g. 1% aqueous solution of sodium pyrophosphate-hydrogen peroxide adduct: pH 9.5; 1% aqueous solution of disodium phosphate-hydrogen peroxide adduct: pH 9.0; 1% aqueous solution of sodium tri-polyphosphate-hydrogen peroxide adduct: pH 9.7), they tend to increase the alkalinity (pH) of foodstuffs when they are added as quality-ameliorating agents in the course of production of the foodstuffs or in the treatment of the finished foodstuffs. This results in various adverse results, e.g. the expected ameliorating action of the additive on the foodstuff quality is weakened and the qualities of the treated foodstuffs are actually affected adversely rather than ameliorated.

For instance, if food preservatives which are employed for the purpose of improving the shelf-lives of foods are those preservatives whose ability varies with the pH of the food, e.g. benzoic acid, prionionic acid, sorbic acid, etc., are contained in foodstuffs to which the said metal phosphate-hydrogen peroxide adduct is added, the pH of the foodstuffs themselves is so increased by the addition of said adduct that the potency of the food preservatives is considerably decreased, sometimes to the extent that the quality of the foodstuffs is adversely affected.

Where the sodium pyrophosphate-hydrogen peroxide adduct is added in the production of bakery products, the general mechanical properties of the dough may be improved, but the rising pH of the dough causes changes in the characteristics of the dough itself, leading sometimes to a deterioration in the quality of the finished products.

Where the surface of unbaked rice cake, raw vermicelli or boiled vermicelli is treated with the metal phosphate-hydrogen peroxide adduct in the form of a powder or a solution, the growth and proliferation of microorganisms on the rice cake or vermicelli are quite effectively inhibited. However, since the adduct exhibits a high alkalinity as hereinbefore described, the surface of the rice cake or vermicelli tends to assume a pale yellowish shade and, at the same time, becomes crustaceous, thus often detracting from the saleability of the products.

When soybean curd is to be kept steeped in an aqueous solution of a metal phosphate-hydrogen peroxide adduct for storage purposes, the soybean curd is not only bleached but is also preserved considerably longer as to its shelf-life. However, because of the alkalinity of the steeping liquor, the curd is subject to various drawbacks, i.e., it becomes softened and warps out of shape.

SUMMARY OF THE INVENTION

This invention is concerned with alleviating the above discussed disadvantages and relates to a method of improving the quality of foodstuffs characterized by adding to foodstuffs a mixture of water soluble metal phosphate-hydrogen peroxide adduct and a water-soluble acid metal phosphate in the ratio of about 1 part adduct to about 0.5 to 4 parts acid metal phosphate.

The foodstuffs treated according to this invention are free from the aforementioned disadvantages and possess improved characteristics.

Thus, the aforementioned mixture is readily soluble in water and its hydrogen peroxide content remains stable enough to act effectively, even in hot aqueous solutions.

An additional advantage of this mixture is that even when it is stored in a powdery form, its hydrogen peroxide content remains stable for long periods of time.

Therefore, if a foodstuff is treated according to this invention or if the foodstuff so treated is stored, the aforementioned adverse effects are not encountered and the mixture so added retains its effective, stabilized action unaffected. Furthermore, the mixture is easy and safe to handle and assures quite excellent and powerful effects.

DETAILED DESCRIPTION OF THE INVENTION

The water-soluble metal phosphate-hydrogen peroxide adduct to be employed in the method of this invention includes various adducts of metal phosphates with hydrogen peroxide which are alkaline in aqueous solutions. Typical of such adducts are the aforementioned adducts of hydrogen peroxide with alkali metal pyrophosphates, di-alkali metal phosphates or alkali metal polyphosphate The above represents only a partial listing of suitable adducts and any other adducts of this type may of course be employed insofar as they are conductive to the attainment of the objectives of this invention.

Ordinarily, these adducts are available in the form of while crystals or powder, and can be easily manufactured.

For example, a suitable method for preparing disodium phosphate-hydrogen peroxide adduct may comprise the steps of reacting one mole of disodium phosphate with from one to two moles of hydrogen peroxide in water or in an aqueous solvent and concentrating the reaction mixture to dryness under reduced pressure or, alternatively, spray-drying said reaction mixture into a powdery form.

The crystalline or powdery adduct obtained according to the above process is stable, and even on prolonged storage, its hydrogen peroxide content remains virtually undissociated and stable.

Ordinarily, when such an adduct is used as a quality-ameliorating agent for foodstuff materials or added to foodstuffs for such purposes as disinfection, preservation, bleaching, improvement of physical properties, etc., it is directly added to the raw materials or foodstuffs in the course of production or treatment of such materials or foodstuffs or added thereto after it has been dissolved or dispersed in a foodstuff solvent. However, as noted above, owing to the strong alkalinity thereof the aforementioned disadvantages are encountered.

It has been suggested to admix the powdery adduct with a crystalline or powdery organic acid, e.g., citric acid, tartaric acid, fumaric acid, malic acid, etc., so as to render the pH of the system neutral or acidic before it is incorporated in the foodstuff to be treated. However, this practice has the disadvantage as evidenced in Experiment 1 below, that the stability of the hydrogen peroxide content thereof, is extremely poor in such mixtures thereby reducing its effectiveness (see Table 1).

It has also been suggested to prepare a solution of the adduct and then to add an inorganic acid, such as hydrochloric acid, sulfuric acid or nitric acid or an organic acid such as one of those acids mentioned above to the solution until the pH thereof is lowered to neutral or to the acid side before the foodstuffs are treated therewith.

The procedure involved, however, is necessarily complicated. Moreover, this process suffers from the disadvantage that the range of applicability is limited depending upon the type of foodstuff treated.

We have discovered that the above noted disadvantages are all overcome when a water-soluble metal phosphate which yields an acidic solution is employed in conjunction with said adduct within the range of proportions hereinbefore specified.

The particular metal phosphate to be employed in the method of this invention is not overly critical, the only requisite being that it must be water-soluble and acidic in aqueous solutions. Illustrative examples include monoalkali metal phosphates, e.g., monosodium phosphate, monopotassium phosphate, etc. and such polymerized or condensed alkali metal phosphates as acid sodium pyrophosphate, acid pyrophosphate, acid sodium tetrametaphosphate, acid potassium tetrametaphosphate, etc. It is to be understood that the foregoing list is illustrative and not limitative of the invention.

In regard to the ratio of said metal phosphate-hydrogen peroxide adduct to said acid metal phosphate, the objects of the invention are successfully accomplished when the ratio lies in the approximate range of 1:0.5 to 9. To ensure that the hydrogen peroxide in the mixture will remain in a stabilized condition, the ratio of about 1:0.5 to 4 by weight is preferred.

The mixture of the invention can be easily prepared according to the conventional methods, i.e., by merely blending the components evenly utilizing a powder mixer of conventional design.

The mixed powder prepared in this manner is extremely stable. Its hydrogen peroxide content remains stable even on prolonged storage as evidenced by Experiment 1 below (see Table 1).

As will be demonstrated in Experiment 2 below, the mixed powder is also stable in aqueous solution, even when the solution is heated at a high temperature for an extended period of time (see Table 2).

The mixture exhibits good solubility in water as evidenced by Experiment 3 and, therefore, can readily be put to immediate use (see Table 3).

As for the mode of incorporating the mixture of the invention in foodstuffs it may be added and mixed into either unprocessed food materials or foods being processed as a powdery preparation or as a solution. Alternatively, finished foods or processed food materials may be treated with the powder mixture or solution of the mixture. According to a still further embodiment, both procedures may be carried out, if desired.

Thus, the aforementioned mixture may be used either as a solid or particulate powder or as a solution as the contemplated application requires. It may be added in any suitable manner that is applicable and best suited to the types of materials, production stages, purposes, processing methods, etc., involved. Thus, the mixture of the invention may be incorporated in the foodstuff by blending, kneading-in, dissolution, steeping, osmosis, spraying, pouring, impregnation and the like. It is only important that the mixture be uniformly dispersed throughout or over the foodstuffs to achieve effective results. The addition may be carried out with the aid of a suitable carrier, dispersing agent or solvent. It is also possible to employ other food additives as well. For example, starch, lactose, preservatives, antioxidants, condiments, food colors, etc. can be utilized. It should of course be understood that any other additive may also be employed insofar as the objects of this invention can still be accomplished.

The amount of the mixture to be added according to the invention depends upon the type of raw food materials, foodstuff, the purpose for which it is intended, and the method of treatment. Generally speaking, the desired results can be attained utilizing from about 0.01 to about 5 percent by weight of the mixture relative to the foodstuff to be treated; although either more or less than the above range may also prove adequate in certain cases.

For example, very satisfactory quality-enhancing results are obtained in various foodstuffs when the mixture of the invention is added in the following concentrations: about 0.03 to 0.6 percent for fish meat and paste; about 0.05 to 1 percent for animal meat; about 2 to 5 percent for cheese; about 0.05 to 1 percent for raw and cooked vermicelli; about 0.02 to 5 percent for unbaked rice cake; about 0.05 to 1 percent for bread and other bakery products; about 0.05 to 3 percent for raw and kneaded bean jams; about 0.05 to 0.2 percent for canned white peaches, and about 0.01 to 2 percent for pickles.

In each of the above cases, none of the various adverse influences which are experienced when any one of the aforementioned metal phosphate-hydrogen peroxide adducts is employed above are encountered.

The method of this invention can be applied easily, safely and effectively to all types of farm, aquatic and animal-based foodstuffs, whether processed or unprocessed, such as animal and fish meats, processed foods based thereon; legumes and products derived therefrom such as soybean curd, soybean paste, liquid condiments, soybeam jam, etc.; vermicelli based on starch and cereals; bread and other bakery foods; confectionary; frozen sweets; various beverages based on garden vegetables and fruits; pickles; fermented foods, such as unrefined and refined sake; pre-cooked vegetables; dairy products; seaweed preparations and the like insofar as they lend themselves to the objects of this invention. Furthermore, since the method of incorporating the mixtures in the foodstuffs is instrumental in simplifying the processing of foodstuffs and in simplifying packaging, its usefulness in the industry is incalculable.

The mixture of the phosphate-hydrogen peroxide adduct and the acid phosphate to be employed according to this invention may be prepared either by admixing the two components which have been separately prepared or by adding hydrogen peroxide to a mixture of the phosphate that will constitute said adduct with hydrogen peroxide and the acid phosphate.

These constituents may be either in the form of solutions or solids.

Illustrative but non-limiting experiments and examples are given as follows:

EXPERIMENT 1

Relative stability of mixtures of metal phosphate-hydrogen peroxide adduct and either organic acid or acid metal phosphate Portions of a powdery metal phosphate-hydrogen peroxide adduct were mixed with a powdery organic acid. Additional portions thereof were mixed with powder acid metal phosphates, and the resulting mixed powders were divided and sealed into several white glass bottles, which were then allowed to stand at room temperature and at 40° C., respectively. Control samples of the adducts containing no acid were similarly sealed and tested.

The stability of each mixed powder was then determined. The results are set forth in Table 1.

The results show that whereas the mixtures of metal phosphate-hydrogen peroxide adduct and acid metal phosphates exhibit good stability, the mixtures of the same adduct and organic acid are extremely unstable. It should also be noted that although the control samples (containing no acid) are relatively stable, they exhibit an extremely high pH.

TABLE 1

| Constituents of mixed powder | | pH of mixed powder (5% aqueous solution) | Stability (percent residual $H_2O_2$) after 1 month at— | |
|---|---|---|---|---|
| Metal phosphate-hydrogen peroxide adduct | Organic acid or acid phosphate | | Room temp. | 40° C. |
| $Na_2HPO_4 \cdot H_2O_2$ | | 9.0 | 100 | 99.5 |
| $Na_4P_2O_7 \cdot 2H_2O_2$ | | 9.6 | 100 | 98.5 |
| $Na_2HPO_4 \cdot H_2O_2/50\%$ | Citric acid/50% | 3.3 | 34.4 | 16.2 |
| $Na_2HPO_4 \cdot H_2O_2/50\%$ | Tartaric acid/50% | 3.6 | 6.8 | 0.1 |
| $Na_2HPO_4 \cdot H_2O_2/50\%$ | Fumaric acid/50% | 3.3 | 6.1 | 0 |
| $Na_2HPO_4 \cdot H_2O_2/50\%$ | Acid sodium pyrophosphate/50% | 6.6 | 99.9 | 99.5 |
| $Na_4P_2O_7 \cdot 2H_2O_2/70\%$ | Anhydrous monosodium phosphate/30% | 7.5 | 100 | 97.5 |
| $Na_4P_2O_7 \cdot 2H_2O_2/50\%$ | Anhydrous monosodium phosphate/50% | 6.5 | 99.5 | 99.5 |
| $Na_4P_2O_7 \cdot 2H_2O_2/25\%$ | Anhydrous monosodium phosphate/75% | 5.5 | 100 | 98.3 |
| $Na_4P_2O_7 \cdot 2H_2O_2/10\%$ | Anhydrous monosodium phosphate/90% | 5.0 | 95.0 | 85.3 |

EXPERIMENT 2

Stability of an aqueous mixed solution of metal phosphate-hydrogen peroxide adduct and acid metal phosphate The mixtures described below in Table 2 were dissolved in water, and 10 ml. of the aqueous solutions were put in white 25 ml. ampoules, which without sealing, were heated at 100° C. to evaluate the stability of the hydrogen peroxide content thereof.

The results show that whereas the mixture of metal phosphate-hydrogen peroxide adduct and acid metal phosphate according to the invention is stable even in aqueous solution, the control sample is objectionably unstable.

TABLE 2

| | Stability (percent residual $H_2O_2$) | | | |
|---|---|---|---|---|
| Heating time (100° C) | 0 hr. | 1 hr. | 2 hrs. | 4 hrs. |
| Sample: | | | | |
| 2.5% aqueous solution of the control additive [1] | 100 | 9.8 | 0 | 0 |
| 5% aqueous solution of the mixed additive [2] | 100 | 98.5 | 97.0 | 89.3 |

[1] $Na_2HPO_4 \cdot H_2O_2$.
[2] $Na_2HPO_4 \cdot H_2O_2$ 50%, plus acid sodium pyrophosphate 50%.

EXPERIMENT 3

Solubility in water of a mixture of metal phosphate-hydrogen peroxide adduct and acid metal phosphate The solubilities in water of $Na_2HPO_4 \cdot H_2O_2$ and the mixture of this invention (50% $Na_2HPO \cdot H_2O_2$ and 50% acid sodium pyrophosphate) were respectively measured (Table 3). The results shows that the solubility of the mixture is comparatively higher.

Table 3

| Sample: | Solubility*, g. |
|---|---|
| Control ($Na_2HPO_4 \cdot H_2O_4$) | 61.7 |
| Mixture | 71.7 |

NOTE. *Denotes the number of grams of each sample dissolved in 100 g. of water.

EXAMPLE 1

In accordance with conventional practice, 3.5 kg. of raw glutinous rice was washed with water and steeped in tap water at room temperature overnight. Next morning, the water was decanted off and the rice steamed for about 20 minutes in the conventional manner, whereby rice cakes (i.e., mochi) were prepared.

The surface of individual rice cakes, ( 5 x 5 x 2 cm.), was uniformly coated with one of the following samples. The rice cakes were respectively put in polyethylene bags which were then sealed and stored at room temperature to evaluate the changes in appearance and consistency of the rice cakes and, also, to check for mold growth.

SAMPLES, AND METHODS OF TREATMENT

| Sample No. | Description of sample | Method of application to the surface of rice cake |
|---|---|---|
| I | Corn starch (control) | Evenly sprayed on, 2 g. per cake. |
| II | Corn starch containing 5% $Na_2HPO_4 \cdot H_2O_2$ and 5% $Na_2H_2P_2O_7$ | Do. |
| III | A 50:50 mixture of $Na_2HPO_4 \cdot H_2O_2$ and $NaH_2PO_4$ | Do. |
| IV | $Na_2HPO_4 \cdot H_2O_2$ (control) | Evenly sprayed on, 0.1 g. per cake. |

The rice cakes which had been stored at room temperature for 2 days were inspected for appearance and consistency. The results are set forth in Table 4.

TABLE 4

| Sample No. | Appearance and consistency |
|---|---|
| I (control) | White, uniform consistency from surface to core. |
| II | Whiter than I; uniform consistency as above. |
| III | Do. |
| IV | A pale yellowish appearance; the surface hardened. |

The same rice cake samples were stored at room temperature for varying periods up to 19 days, and the surface of each rice cake periodically inspected for mold growth. The results are set forth in Table 5.

TABLE 5

| | Storage time in days | | | | | | |
|---|---|---|---|---|---|---|---|
| Sample No. | 1 | 2 | 4 | 5 | 7 | 9 | 15 | 19 |
| I (control) | − | − | + | + | + | + | + | + |
| II | − | − | − | − | − | − | − | − |
| III | − | − | − | − | − | − | − | − |
| IV (control) | − | − | − | − | − | − | − | − |

NOTE: +=Black and green molds; −=No mold growth.

It is apparent from the results set forth in Tables 4 and 5 that, although the adduct when employed above affords protection against mold growth, it does not stabilize the rice cakes against an alteration in appearance due to its alkalinity. The mixture according to the invention stabilized the cakes against mold growth and functioned further to avoid deleterious effects of the alkaline nature of the adduct.

EXAMPLE 2

Sample I: Soybean-curd (tofu, commercial rough-mesh grade) was steeped in tap water at 30° C. (control).

Sample II: The same commercial soybean curd as above was steeped in a 0.1% of aqueous solution of disodium phosphateoxygen peroxide aduct $$(Na_2HPO_4 \cdot H_2O_2)$$

under otherwise the same conditions as control Sample I.

Sample III: The same commercial soybean curd as above was steeped in a 0.2% aqueous solution of a powdery (50:50) mixture of disodium phosphate-hydrogen peroxide and monosodium phosphate under otherwise the same conditions as I.

Sample IV: The same commercial bean-curd as above was steeped in a 0.2% aqueous solution of a powdery (50:50) mixture of disodium phosphate-hydrogen peroxide adduct and acid sodium pyrophosphate under otherwise the same conditions as Sample I.

Each sample was periodically inspected for signs of putrefaction and changes in consistency. The results are set forth in Table 6.

TABLE 6

| Sample | Storage time in hours | | | | | |
|---|---|---|---|---|---|---|
| | 0 | 24 | 32 | 48 | 72 | 96 |
| I (control) | − | + | + | + | + | + |
| II (control) | − | − | ± | ± | + | + |
| III | − | − | − | − | − | ± |
| IV | − | − | − | − | − | − |

NOTE: −=No sign of putrefaction; +=A clear sign of putrefaction; ±=A hint of putrefaction.

Compared with I and II, the Samples III and IV of the invention not only better retain their original shape but also the flavor characteristic of soybean curd.

EXAMPLE 3

Sample I: Commercial raw noodles were placed in a dish which, with access to the atmosphere, was held at constant temperature and humidity, 35° C. and 80% RH (control).

Sample II: The same commercial raw noodles as above were dipped for 10 seconds in a 1% aqueous solution of sodium pyrophosphate-hydrogen peroxide adduct $$(Na_4P_2O_7 \cdot 2H_2O_2)$$

Thereafter, the noodles were allowed to stand under the same conditions as I (control).

Sample III: The same commercial raw noodles as above were dipped for 10 seconds in a 1% aqueous solution of a powdery (70:30) mixture of sodium pyrophosphate-hydrogen peroxide adduct and anhydrous monosodium phosphate. Thereafter, the noodles were kept standing under the same conditions as I.

Sample IV: The same commercial raw noddles as above were dipped for 10 seconds in a 2% aqueous solution of a powdery (50:50) mixture of sodium pyrophosphate-hydrogen peroxide adduct and anhydrous monosodium phosphate. Then, the noodles were allowed to stand in the same manner as I.

Each sample was periodically inspected for mold growth and odor, as well as for changes in appearance. The results are set forth in Table 7.

The results show that according to the invention, raw noodles can be preserved for long periods of time, with their quality unaffected. Thus the foodstuffs stabilized according to the invention remained stable with respect to mold growth, odor and appearance for longer periods of time than those constituting the controls, i.e., foodstuffs to which either no additive was added or to which only the adduct was added.

TABLE 7

| Sample | Quality | Storage time in hours | | | | | |
|---|---|---|---|---|---|---|---|
| | | 0 | 24 | 32 | 48 | 72 | 96 |
| I (control) | Mold growth | − | + | + | + | + | + |
| | Odor | − | + | + | + | + | + |
| | Appearance | White, browning faintly but progressively with time. | | | | | |
| II (control) | Mold growth | − | − | − | ± | + | + |
| | Odor | − | − | − | ± | + | + |
| | Appearance | A cast of yellow, reaching the condition of I after 48 hours. | | | | | |
| III | Mold growth | − | − | − | − | ± | + |
| | Odor | − | − | − | ± | ± | + |
| | Appearance | Whiter than 0. No browning occurs on storage. Translucency increases with time. | | | | | |
| IV | Mold growth | − | − | − | − | − | ± |
| | Odor | − | − | − | − | − | ± |
| | Appearance | Whiter than I. No browning occurs on storage. Translucency gains with time. | | | | | |

NOTE: −=Not detected; ±=Suspected; +=Detected.

EXAMPLE 4

A mixture of 35 parts pork, 45 parts mutton and 20 parts beef tallow was thoroughly kneaded into a paste, to which 0.2% by weight of sorbic acid was added. The mixture was further kneaded well. (This pasty mixture was labeled A.) Using A, the following samples are prepared.

Sample I: A portion of A was put in a dish, which with access to the atmosphere, is held at constant temperature (30° C.) and humidity (80%) (control).

Sample II: 1% of sodium tri-polyphosphate-hydrogen peroxide adduct (hydrogen peroxide content 19.3%) was added to a portion of A. The mixture was kneaded well and stored under the same conditions as I (control).

Sample III: 2% of a powdery (50:50) mixture of sodium tri-polyphosphate-hydrogen peroxide adduct and acid sodium tetrametaphosphate was added to a portion of A, and the mixture was kneaded well and stored under the same conditions as I.

Each sample was inspected from time to time for sliminess and odor. The results are set forth in Table 8.

The results show that in Sample III, the preservative sorbic acid is allowed to function so effectively that the animal meat paste can be preserved in stabilized condition for long periods of time; whereas in the control samples, odor and sliminess occurred at an earlier stage.

TABLE 8

| Sample | Quality | Storage time in hours | | | | |
|---|---|---|---|---|---|---|
| | | 0 | 24 | 32 | 48 | 72 |
| I (control) | Sliminess | − | + | + | + | + |
| | Odor | − | + | + | + | + |
| II (control) | Sliminess | − | − | + | + | + |
| | Odor | − | ± | + | + | + |
| III | Sliminess | − | − | ± | + | + |
| | Odor | − | − | ± | + | + |

NOTE: −=Not detected; ±=Suspected; +=Detected.

EXAMPLE 5

In the production of pickled scallions (Rakkyo) in the conventional manner, 0.5 to 1 percent of a powdery (50:50) mixture of sodium pyrophosphate-hydrogen peroxide adduct and anhydrous monosodium phosphate was dissolved in a sweetened kitchen vinegar (10 kg. water, 1 kg. sugar, 1 kg. millet jelly, 100 g. glacial acetic acid, 50 g. citric acid, 10 g. malic acid, 150 g. sodium chloride, 10 g. potassium sorbate, 10 g. sodium succinate and 40 g. sodium glutamate), and desalted scallions were steeped in the solution. The same procedure was followed employing a 50:50 mixture of disodium phosphate-hydrogen peroxide adduct and acid sodium pyrophosphate.

Compared with control scallions (pickled without the additives), the pickled scallions prepared above have attractive color and gloss and do not undergo browning on prolonged storage.

EXAMPLE 6

When boiling raw material beans (white kidney beans; Shiroingenmame) for the production of bean jam, the following samples were added to the cooking waters:

Sample I: Control (tap water only).

Sample II: 0.2% of sodium pyrophosphate-hydrogen peroxide adduct ($Na_4P_2O_7 \cdot 2H_2O_2$) dissolved in I (control).

Sample III: 0.2% of disodium phosphate-hydrogen peroxide adduct ($Na_2 \cdot HPO_4 \cdot H_2O_2$) dissolved in I. (control).

Sample IV: 0.2% of sodium pyrophosphate-hydrogen peroxide adduct and 0.1% of anhydrous monosodium phosphate dissolved in I.

Sample V: 0.2% of disodium phosphate-hydrogen peroxide adduct and 0.1% of acid sodium pyrophosphate dissolved in I. (The method of this invention.)

Forty g. samples of the material beans were boiled in 200 ml. each of the sample solutions, respectively, and a sense test carried out on the boiled beans for appearance and consistency. The results are set forth in Table 9.

It is obvious therefrom that the beans boiled in sample solutions IV and V, respectively, better retain their original shapes and have their individual grains evenly softened overall. Moreover, their seed coats are readily scraped off so that they may be more easily processed into bean jams.

TABLE 9

| Sample No. | Appearance and consistency of boiled beans |
|---|---|
| I (control) | Beans somewhat softened but not enough to be milled early, with seed coats clinging rather tight. |
| II (control) | Beans softened unevenly; partically out of shape. See coats are easy to scrape off. |
| III (control) | Do. |
| IV | Beans evenly softened, retaining their original shapes, with seed coats easy to remove. |
| V | Do. |

The addition, in the course of the production of unsweetened or sweetened bean jam, of a powdery (50:50) mixture of sodium pyrophosphate-hydrogen peroxide adduct and anhydrous monosodium phosphate in the amount of 0.3 to 0.5 percent by weight relative to product jam results in a bleached jam which assumes a glossy appearance and which is less susceptible to putrefaction. Identical results were produced utilizing a 50:50 mixture of disodium phosphate-hydrogen peroxide adduct and acid sodium pyrophosphate.

It is to be understood that all percentages and proportions expressed herein are by weight.

What we claim is:

1. A composition particularly adapted for improving the quality of foodstuffs comprising a mixture of a water-soluble metal phosphate-hydrogen peroxide adduct and a water-soluble acid metal phosphate, the ratio of said adduct to said metal phosphate being about 1 part by weight to from about 0.5 to about 9 parts by weight.

2. The composition of claim 1 wherein said metals are alkali metals.

3. The composition of claim 2 wherein the ratio of said adduct to said acid metal phosphate is about 1 part by weight to from about 0.5 to about 4 parts by weight.

4. The composition of claim 2 wherein said adduct comprises a hydrogen peroxide adduct of a salt selected from the group consisting of alkali metal pyrophosphates, di-alkali metal phosphates, alkali metal polyphosphates, and mixtures thereof.

5. The composition of claim 1 wherein said acid metal phosphate is a member selected from the group consisting of monoalkali metal phosphates, condensed alkali metal phosphates and mixtures thereof.

6. An improved stabilized foodstuff containing from about 0.01 to about 5% by weight based on said foodstuff of the composition of claim 1.

7. An improved, stabilized foodstuff containing from about 0.01 to about 5% by weight based on said foodstuff of the composition of claim 2.

8. An improved, stabilized foodstuff containing from about 0.01 to about 5% by weight based on said foodstuff of the composition of claim 3.

9. An improved, stabilized foodstuff containing from about 0.01 to about 5% by weight based on said foodstuff of the composition of claim 4.

References Cited

UNITED STATES PATENTS

| | | | |
|---|---|---|---|
| 1,866,412 | 7/1932 | Lee | 99—232 X |
| 2,272,577 | 2/1942 | Penn | 99—232 |
| 2,777,749 | 1/1957 | Young | 99—91 X |
| 3,088,828 | 5/1963 | Renner | 99—91 X |
| 3,243,304 | 3/1966 | Parker | 99—232 |
| 3,545,982 | 12/1970 | Nakatani et al. | 99—150 |

OTHER REFERENCES

Encyclopedia of Chemical Technology (1966), vol. 10, pp. 3 and 8.

NORMAN YUDKOFF, Primary Examiner

H. H. BERNSTEIN, Assistant Examiner

U.S. Cl. X.R.

252—397; 426—227

UNITED STATES PATENT OFFICE
CERTIFICATE OF CORRECTION

Patent No. 3,792,177          Dated February 12, 1974

Inventor(s) Hiromi Nakatani and Kiyoshi Katagiri

It is certified that error appears in the above-identified patent and that said Letters Patent are hereby corrected as shown below:

Column 1, line 11, change "Dec. 8, 1989" to

-- Dec. 8, 1987 --.

Signed and sealed this 23rd day of July 1974.

(SEAL)
Attest:

McCOY M. GIBSON, JR.
Attesting Officer

C. MARSHALL DANN
Commissioner of Patents